United States Patent
Theodore et al.

(10) Patent No.: US 11,025,439 B2
(45) Date of Patent: Jun. 1, 2021

(54) SELF-ORGANIZING MOBILE PEER-TO-PEER MESH NETWORK AUTHENTICATION

(71) Applicant: Raytheon Company, Waltham, MA (US)

(72) Inventors: David James Theodore, Austin, TX (US); Blake Cameron Sims, Arlington, TX (US); Andres Rios, Dallas, TX (US); Hyperia Doe, Grand Prairie, TX (US); Jesse Jonathan Lee, McKinney, TX (US); Alfonso Andres Lopez, Plano, TX (US)

(73) Assignee: Raytheon Company, Waltham, MA (US)

( * ) Notice: Subject to any disclaimer, the term of this patent is extended or adjusted under 35 U.S.C. 154(b) by 357 days.

(21) Appl. No.: 16/104,738

(22) Filed: Aug. 17, 2018

(65) Prior Publication Data

US 2019/0068382 A1  Feb. 28, 2019

Related U.S. Application Data

(60) Provisional application No. 62/552,036, filed on Aug. 30, 2017.

(51) Int. Cl.
*H04L 29/06* (2006.01)
*G06F 21/00* (2013.01)
(Continued)

(52) U.S. Cl.
CPC ............ *H04L 9/3271* (2013.01); *G06F 21/35* (2013.01); *H04L 9/321* (2013.01); *H04L 9/3218* (2013.01);
(Continued)

(58) Field of Classification Search
CPC . H04L 9/3271; H04L 63/0869; H04L 9/3218; H04L 63/107; H04L 9/321;
(Continued)

(56) References Cited

U.S. PATENT DOCUMENTS 9,076,273 B2 * 7/2015 Smith .................. G07C 9/20
9,513,364 B2 * 12/2016 Hall ...................... H04L 67/10
(Continued)

FOREIGN PATENT DOCUMENTS

| EP | 1624416 A2 | 2/2006 |
| EP | 2272271 A2 | 1/2011 |
| WO | WO-2019046021 A1 | 3/2019 |

OTHER PUBLICATIONS

"Security and Identity for AWS IoT- AWS IoT," https://docs.aws.amazon/com/iot/latest/developer . . . , accessed Aug. 7, 2018.
(Continued)

*Primary Examiner* — Lisa C Lewis
(74) *Attorney, Agent, or Firm* — Schwegman Lundberg & Woessner, P.A.

(57) ABSTRACT

A plurality of authentication devices form and manage a self-organizing mobile peer-to-peer mesh network to provide robust authentication of mobile peers, humans and or mobile devices such as drones, cars, satellites, robots etc. The mesh network may supplement traditional fixed point of entry authentication to combat social engineering penetrations or be used in situations where fixed-point authentication is not viable. Network efficiency can be enhanced by using two-level encryption, a first level of encryption based on permissions to join a mesh network and a simpler second level of encryption based on knowledge shared with members of the network for communication. Making the permissions a function of location can make the network more
(Continued)

robust. Re-authenticating member peers based on the occurrence of defined events can further enhance security.

22 Claims, 10 Drawing Sheets

(51) Int. Cl.

| | | |
|---|---|---|
| H04L 9/32 | (2006.01) | |
| H04W 12/06 | (2021.01) | |
| H04W 12/08 | (2021.01) | |
| G06F 21/35 | (2013.01) | |
| H04W 84/18 | (2009.01) | |
| H04L 29/08 | (2006.01) | |
| B64C 39/02 | (2006.01) | |
| H04W 12/63 | (2021.01) | |

(52) U.S. Cl.
CPC ........ *H04L 63/0869* (2013.01); *H04L 63/107* (2013.01); *H04W 12/06* (2013.01); *H04W 12/08* (2013.01); *B64C 39/024* (2013.01); *G06F 2221/2111* (2013.01); *H04L 67/1046* (2013.01); *H04L 67/12* (2013.01); *H04L 2209/80* (2013.01); *H04W 12/63* (2021.01); *H04W 84/18* (2013.01)

(58) Field of Classification Search
CPC . H04L 67/12; H04L 67/1046; H04L 2209/80; G06F 21/35; G06F 2221/2111; H04W 12/06; H04W 12/08; H04W 12/63; H04W 84/18; H04W 12/065; H04W 12/40; B64C 39/024
See application file for complete search history.

(56) References Cited

U.S. PATENT DOCUMENTS

| | | | |
|---|---|---|---|
| 2005/0120073 A1* | 6/2005 | Cho | ........................ H04L 67/16 709/201 |
| 2008/0222711 A1* | 9/2008 | Michaelis | ............. H04W 12/06 726/7 |
| 2015/0244699 A1* | 8/2015 | Hessler | ................... G06F 21/44 726/7 |
| 2016/0073288 A1* | 3/2016 | Patil | .................. H04W 28/0289 370/230 |
| 2017/0032644 A1* | 2/2017 | Hildick-Pytte | ........ G06Q 90/20 |
| 2017/0134359 A1* | 5/2017 | Copsey | ................... H04L 63/08 |
| 2017/0325091 A1* | 11/2017 | Freeman | ............. A61B 5/0077 |

OTHER PUBLICATIONS

"CC2650 SimpleLink Multistandard Wireless MCU," Texas Instruments Product Folder Links CC2650, Jul. 2018.
"New System Provides Instant Authentication Drone's Identity," https://unmanned-aerial.com/new-system-provides . . . , accessed Aug. 7, 2018.
Wemme, "Drone Identification & Authentication," Creating a Better Future with Drones, Infineon, MWC 2018, Barcelona.
"Providing the industry's broadest range of smart card-based credentials," https://www.hidglobal.com/products-display/cards . . . , accessed Aug. 7, 2018.
"Mesh Networking," WikipediA, https://wikipedia.org/wiki/Mesh_networking, accessed Aug. 7, 2018.
"ATECC508A CryptoAuthentication Device Complete Data Sheet," Datasheet Complete, Microchip Technology, Inc., 2017.
Network Topology, WikipediA, https://en.wikipedia.org/wiki/Network_topology, accessed Aug. 7, 2018.
"What is RFID and How Does RFID Work?," AB&R, http://www.abr.com/what-is-rfid_how_does-rfid-work/, accessed Aug. 7, 2018.
"International Application Serial No. PCT/US2018/046992, International Preliminary Report on Patentability dated Mar. 12, 2020", 13 pgs.
"International Application Serial No. PCT/US2018/046992, International Search Report dated Jan. 10, 2019", 6 pgs.
"International Application Serial No. PCT/US2018/046992, Invitation to Pay Additional Fees dated Nov. 7, 2018", 12 pgs.
"International Application Serial No. PCT/US2018/046992, Written Opinion dated Jan. 10, 2019", 11 pgs.

* cited by examiner

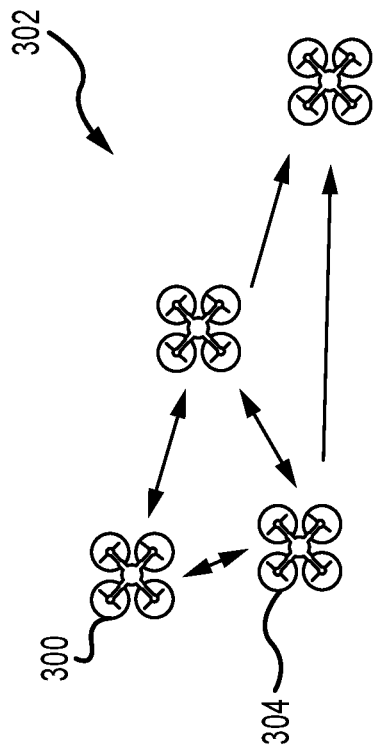
FIG.7
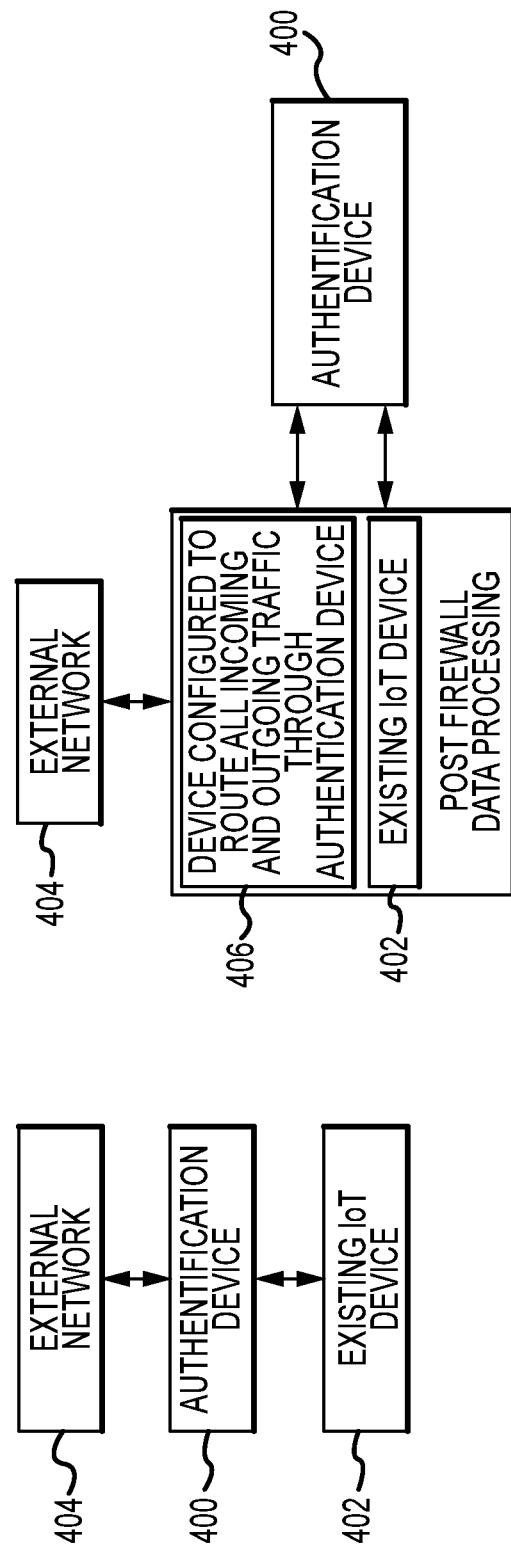
FIG.8b
FIG.8a

SELF-ORGANIZING MOBILE PEER-TO-PEER MESH NETWORK AUTHENTICATION

CROSS-REFERENCE TO RELATED APPLICATIONS

This application claims benefit of priority under 35 U.S.C. 119(e) to U.S. Provisional Application No. 62/552,036 entitled "Peer-to-Peer Mesh Network Authentication" and filed on Aug. 30, 2017, the entire contents of which are incorporated by reference.

BACKGROUND OF THE INVENTION

Field of the Invention

This invention relates to physical security access management and authentication, and more particularly to a system for peer-to-peer authentication.

Description of the Related Art

Penetration testers often audit secure facilities for multiple security requirements. Many times, the weakest link found in site security is that once a penetration tester can get in the front door, the tester is usually able to move around the site. If an attacker can bypass the authentication required to get into the facility, the attacker can move around unchallenged through the rest of a secure facility.

A device used for physical security access management is the typical Radio-Frequency Identification (RFID) badge. The badge isn't self-powered so when the RFID badge gets close to the door to the building, a device on the door will create a pulse that will power the RFID chip's internal processes. The signal will "wake up" the RFID chip causing the chip to send its identification number to the device on the door. The device on the door would then check if the person with the badge has permission to be in the building. The problem with this device is that the ID number that is generated does not change and it is not private, meaning that someone can "listen in" on the device and get the ID number. A malicious actor can then spoof or fake the identity of that badge that was captured.

This type of security check is susceptible to many different types of attacks. The most prevalent is known as "piggybacking" or "tailgating"—a social engineering technique where an unauthorized person tags along behind an authorized person to gain access to a restricted physical location. Piggybacking refers to a situation where the door is willingly opened for an attacker and tailgating refers to situations when the authorized person is unaware that an unauthorized person made it through the checkpoint before the door locked. Either of these situations can pose a serious threat to security because an attacker is often free to roam unchecked through the restricted area after they have made it through the security checkpoint.

A common access card (CAC) is an identification card that includes an integrated chip. The Department of Defense (DoD) uses CACs to secure access to restricted areas, buildings, and equipment. The card is scanned at a gate or door, or inserted into a CAC card reader slot in a DoD computer to gain access. The card's chip contains and creates the user's public/private keys, provides public key infrastructure (PKI), and digital certificates. Public key infrastructure is a system implemented to encrypt data and make sure the data is sent or received by the person intended. PKI is designed to be more difficult to forge than the username/password approach to securing information. One example of how the CAC utilizes PKI is when inserted or scanned, an encrypted digital certificate is sent to an overseeing system. This system then verifies that the certificate comes from the person it should be through a public/private key exchange. Anything encrypted by the public key can only be decrypted by the associated private key generated and vice-versa. This ensures the certificate is associated with the person to whom it belongs.

The certificates are the person's permission key either allowing them or not allowing them access to certain areas or documents. Typically, the CAC card provides a second level of security using a pin or biometrics to help alleviate stolen cards from accessing secure areas. The CAC card does work better than username/passwords for security and is approved by the DoD to replace them, however, they do have their drawbacks. The biggest drawback is a social engineering attack to bypass security at a fixed point of entry.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides authentication devices for forming and managing a self-organizing mobile peer-to-peer mesh network authentication system. The system utilizes the properties of a mesh network that does not risk a single-point-of-failure like traditional systems and can maintain operation even if one of the peers or "participants" (individual or fixed or mobile device) is either malicious or has been compromised. This allows for much broader coverage of a secure facility since checkpoints can now become mobile and dispersed. Attacks like piggybacking and tailgating are now unreasonable to execute.

In an embodiment, a Self-Organizing Mobile Peer-to-Peer Mesh Network Authentication System extends the fixed point of entry checkpoint in a traditional authentication system so that a mobile checkpoint exists on all of the authentication devices. The process of authenticating an individual peer is the responsibility of fellow peers in the mesh network. In a particular example the authentication devices are personnel security badges that act as their own self-verifying checkpoints. Each badge challenges nearby peers for their identity or permissions to be in a location proximate (and possibly additional to use a resource) and authenticates itself to other peers. Successful authentication earns membership of the individual peer in an exclusive self-organizing mobile peer-to-peer mesh network aka "mesh network". The successful or unsuccessful authentication of a peer is communicated to other previously authenticated peers in the mesh network. As more peers join the mesh network it becomes stronger as it can cover larger areas and provide more checks. The peers are not limited to individuals but could be other mobile devices such as drones, automobiles, satellites or rover robots or fixed devices such as computers or other secure equipment authenticating against each other.

The Peer-to-Peer Mesh Network Authentication System includes authentication devices that rely on a wireless communication method to communicate with each other.

The communication supports a method of authenticating permission for a place or resource using either proof of knowledge or identity. The authentication devices are aware of peers that they are interacting with and challenge them to verify that permission. Once challenged, the authentication devices can keep track of who they have and have not verified and communicate to each other this information. If a peer is either in an area or using a resource that they are not permissioned for the authentication devices can alert peers and broadcast an alarm to the mesh network. The system can invoke trustless challenge/response authentication that provides little or no information gain compared to traditional systems. The exclusive mesh that the system subcomponents create provides robust security, as there must be cryptographic proof of knowledge or identity to join. The exclusive mesh may also provide efficient security by using a simpler cryptographic proof knowledge once a peer has been authenticated and joined the mesh network to communicate among peers.

In an embodiment, each authentication device is aware of its own location or the location of another peer such as by inclusion of a positioning receiver configured to receive location signals from fixed beacons, configured as a GPS module, triangular calculation or computer vision. The location of either the challenging authentication device, the location of the authentication device being challenged, or the location of both devices, is taken into consideration in deciding the parameters of the aforementioned challenge and permissions granted. An individual peer may be granted access to a given building but denied access to particular rooms or resources, or may only be granted access to those rooms or resources if in the presence (and authenticated by) another peer with superior permissions.

In an embodiment, the system is configured to authenticate based on specified peer or resource events in addition to proximity of one participant to another. Such events might include expiration of timers, random requests, high priority actions like unlocking a sensitive file, or on interaction with other computing devices. A peer's badge may authenticate against a laptop, which may also be a peer, upon log in, opening certain programs or files, every N key strokes, etc. If the authentication device supports proximity awareness or location awareness then the laptop can even determine if the peer is still within a few feet of the keyboard on each authentication. Event-based authentication can be configured to run autonomously and authenticate seamlessly and with little or no user interaction if necessary.

In different embodiments, the Peer-to-Peer Mesh Network Authentication System may use different types of authentication. The exclusivity of the mesh network requires that persistent cryptographic sessions remain open so that impersonations of authenticated badges does not happen by unauthenticated badges. There are many possible ways that this can be done to save power and yet still cater to the type of authentication that the system is using at the time. Generally speaking a $1^{st}$ level of authentication verifies whether a participant has the proper permissions to join a mesh network, which can be done with either identity or knowledge. Post-authentication all communication including proving that a participant is part of the mesh network us a $2^{nd}$ level of authentication that verifies knowledge that was generated by and shared among authenticated network members. The $2^{nd}$ level encryption is typically far less complex (e.g. shorter code lengths or less computations) than the $1^{st}$ level encryption.

The most common method of cryptographic identity based authentication relies on an asymmetric cryptography, like what is used in "public key" cryptosystems. This type of cryptography has each and every participant create a set of keys that can be used to identify themselves. The issue with this system is that the signatures required proving identity can be costly in computation resources and power. Because the mesh can provide a certain degree of extended trust, this can be overcome in certain ways. The authentication devices may be configured such that a first authentication to gain allowance to participate in the mesh network is done using a cryptographic challenge/response or signature such as a public key signature to prove either knowledge or permissioned identity. Thereafter, all post-authentication communication to the mesh from the device is signed with a message authentication code (e.g., key-hashed) to guarantee allowance as communication in the mesh as well as message integrity. The secret key for that code is decided upon by the group and shared in the initial authentication using symmetric or asymmetric encryption. The initial authentication may use a public key signature.

In an embodiment, an authentication device is used to authenticate an Internet of Things (IoT) device to one or more external devices to join a peer-to-peer network. The authentication device includes a gateway to route all incoming and outgoing communications through an encryption processor that issues the cryptographic challenges and responses to form the network. The authentication device may either include a power supply and a bi-direction communication device or may draw power from the IoT device and use its communication capability. These IoT devices can range from simple microcontrollers to advanced microprocessors running small computing systems created to do specific jobs like CCTV cameras, printers, smart thermostats, etc. All traffic leaving the device can be checked to make sure that it is encrypted if needed and nothing sensitive can be let out from the secure compute section to the communication interface if it is vulnerable to eavesdropping. This sort of architecture can provide a device-based gateway or firewall that can still run efficiently with very little power usage or availability of service. The gateway can provide an interactive interface for remote administration if needed.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 7 is a diagram of a self-organizing mobile peer-to-peer mesh network using authentication devices attached to or integrated with drones; and FIGS. 8a and 8b illustrate embodiments of an authentication device for authenticating an Internet of Things (IoT) device to external devices.

DETAILED DESCRIPTION OF THE INVENTION

The present invention describes a plurality of authentication devices, paired with mobile peers, to form and manage a self-organizing mobile peer-to-peer mesh network to provide robust authentication of individual peers, humans and or mobile devices such as drones, cars, satellites, robots etc. The mesh network may also include a number of fixed peers such as computers or other equipment. The mesh network may be used to supplement traditional fixed point of entry authentication to combat social engineering techniques or may be used in situations where fixed-point authentication is not viable e.g., a drone network. Network efficiency can be enhanced by using two-level encryption, a first level of encryption based on permissions to join a mesh network and a simpler second level of encryption based on knowledge shared with members of the network. A member peer may broadcast its membership in the network using the simpler second level of encryption to avoid unnecessary challenges. The network can be made more robust by making the permissions a function of location, which is determined by each peer. Security can be enhanced by re-authenticating member peers based on the occurrence of defined events. Peers who fail authentication or are "dummies" who simply don't respond can trigger warnings in the form of audio or visual responses by their device, challenging device, other devices in the network or a central authority.

Figure 1:
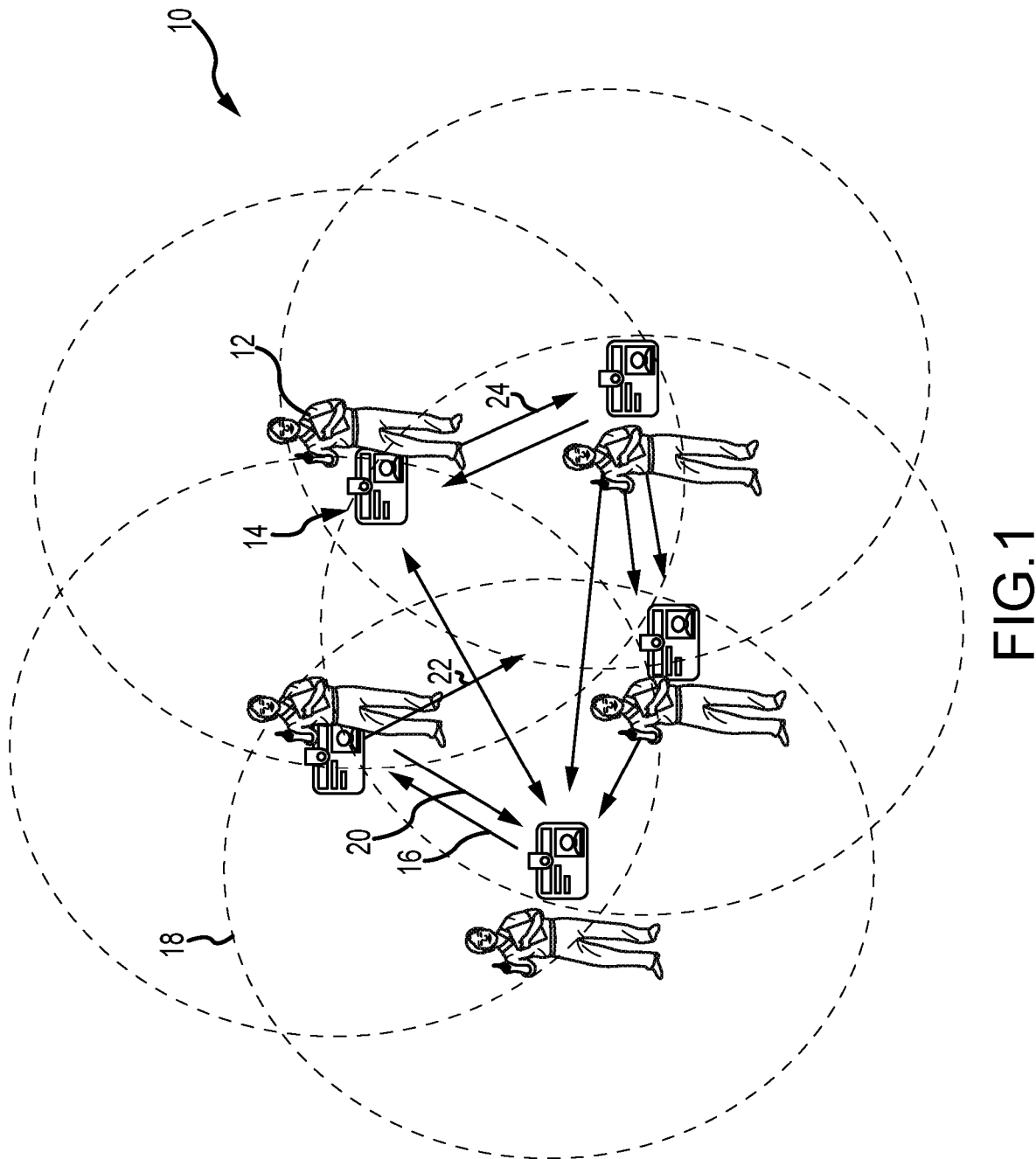
FIG. 1 is a diagram of a self-organizing mobile peer-to-peer mesh network using authentication devices.

Referring now to FIG. 1, a self-organizing mobile peer-to-peer mesh network ("mesh network") 10 provides an authentication system for two more mobile peers 12 (shown here as individual persons). At its core, the mesh network 10 confirms or denies (authenticates) a peer's permission to be in a location proximate the other member peers of the mesh network. The mesh network may additionally authenticate what permissions a peer may or may not have to be in a particular location or to use a particular resource in a particular location. For additional security, the mesh network may re-authenticate member peers based on the occurrence of certain events e.g. actions taken by either the challenging or responding peer or by the interaction of these peers. The mesh network may provide for efficient, secure and persistent communication among member peers. The mesh network can identify non-member peers and trigger warnings accordingly.

A plurality of authentication devices 14 is paired with respective peers 12 e.g. each individual has a badge. Each authentication device 14 includes a controller and a bi-directional communication device configured to issue a cryptographic challenge 16 to other authentication devices in proximity 18 to the issuing authentication device and to authenticate itself via a cryptographic response 20 to other authentication devices posing a cryptographic challenge. A successful authentication joins the peer 12 to the self-organizing mobile peer-to-peer mesh network 10 that verifies permissions of its member peers to be in a location proximate the other member peers. The challenging and/or authenticated peer may broadcast verification 22 of a new member peer to the mesh network by, for example, transmitting a shared group secret. All subsequent communication 24 within the network may, for example, be signed with the group secret. This provides sufficient proof that the communication originated from a trusted member peer without requiring the processing for a full re-authentication on each communication. Unsuccessful authentication generates a warning signal that the challenged peer lacks proper permission. This warning signal may activate an audio or visual response on the denied peer's authentication device, the challenging peer's authentication device, one or more member peer's authentication devices, a central authority or a combination thereof.

Mesh network 10 is used to describe a network topology in which the connections between the members, or nodes, of a network are peer-to-peer. Peer-to-peer connections are often referred to as ad-hoc connections. These types of connections are common between humans when communicating, but are not always common in electronic device communication. Peer-to-Peer connections in this project aide in security because they are resilient to single-point-of-failure attacks. In this topology, peers can communicate with other members of the network by routing messages through other nodes. In most cases there is no central authority that keeps track of the attached members. Membership is instead decided upon by a group consensus and is documented and tracked with a shared list of attached members and their "addresses." The addresses indicate the routes in which messages can be routed through the group to reach their intended destination nodes.

Authentication describes the process of proving either knowledge of a secret or identity. In an example implementation of this system these are handled cryptographically and described briefly below. The Self-Organizing Mobile Peer-to-Peer Mesh Network Authentication System does not necessarily need to rely on the methods below for authentication.

Identity—In this particular implementation of the system, identity was proven using ECDSA elliptical curve cryptographic signatures. The elliptical curve properties allow for a public and private key that have a mathematical relationship allowing for a message output that can prove knowledge of the private key. The private key is never given out and can be used to prove that a device is actually the entity described by the public key. This is a common authentication method often used in public key cryptography implementations.

Knowledge—There may be cases where a device does not want to disclose who it is but is required to prove adequate permissions for a location or access to information. Proving knowledge of a secret can do this. In the example implementation of this system this is done using a sha-256 message digest. The digest is a one-way function in which the result cannot easily be reverse-computed to find the inputs that created it. Challenges for knowledge are done by producing a "nonce," a one-time-use random or incremented value to be combined with the secret knowledge as an input to the SHA-256 message digest algorithm. The device being challenged will compute the answer and respond to the challenger. The challenger can accept this answer as proof that the device in question does indeed know the secret if they are able to come to the same answer. This method is sufficient for authentication that needs to provide permission for a location that is guarded by a known secret as a substitute for proving an identity that is accepted as permissioned for the location. There is less information disclosed in this exchange than in proving identity, which can be beneficial or harmful to security, depending on the circumstances.

Pre-authentication, identification or a relatively complex knowledge ("network permission identifier") may be used to sign a cryptographic response to prove a peer's permission to join the mesh network. Once the peer has joined the network, all post-authentication communication may use a less complex knowledge ("network membership identifier") for efficiency. The peer's membership in the mesh network can be shared with the other member peers using this less complex knowledge.

The word "trustless" is used herein to describe degree of reliance of one device on another in this system. For example, if a device or the user operating the device believes that a malicious party may have compromised a peer, then they may want to provide a proof-of-knowledge handshake with the foreign device instead of a proof-of-identity. This would prevent that foreign device from being able to gain information about who the individual is but still provides the required proof of permission for the individual to be in their current location. Other examples of the "trustless" properties of this system include how devices in high security areas may require self-checking of all peers. The devices may be able to rely on a peer's testimony that a third party has proven authentication in lower security areas but may be less trusting of other peers in the hive when located in high-security areas or when under a high-alert mode. This system is already more trustless than many traditional authentication systems because peer devices are checking each other. In many traditional authentication systems, the individual members trust that the system has already authenticated their peers and do no checking of their own. The authentication may utilize a trustless cryptographic challenge/response algorithm in which the identity of neither party is revealed in either successful verification or unsuccessful verification or both parties are revealed in either successful verification or unsuccessful verification. Authentication tokens may only reveal and verify identity to a central authority using a PKI method to receive their permissions and then use these permissions to verify permission of location and/or permission of access amongst peers, without revealing their identity to these peers. The challenge/response algorithm may use a one-time password that relies on a time based nonce, a true-random or pseudo-random based nonce, a nonce that is derived from challenger's ID and an iterated variable or any combination thereof. The authentication tokens may log the peer's location and activity. The authentication tokens may use a cryptographic algorithm to maintain open sessions with each other so that the authentication challenge does not have to be repeated unless a session is ended due to an event or expiration.

The Mesh network 10 may be initially formed when the first two peers 12 come into proximity 16 with each other. Proximity may be determined by the strength of a signal emitted by one peer's authentication device and received by the other peer's authentication device or by a determination of location of the peer devices via fixed position beacons, GPS receivers, triangulation or computer vision. Mesh network 10 may grow as other peers are challenged and authenticated or shrink as peers leave the area or their permissions expire. Different mesh networks 10 may merge to form a larger mesh network. The mesh networks may be dissolved based on a time-schedule or upon completion of a task.

Figure 2:
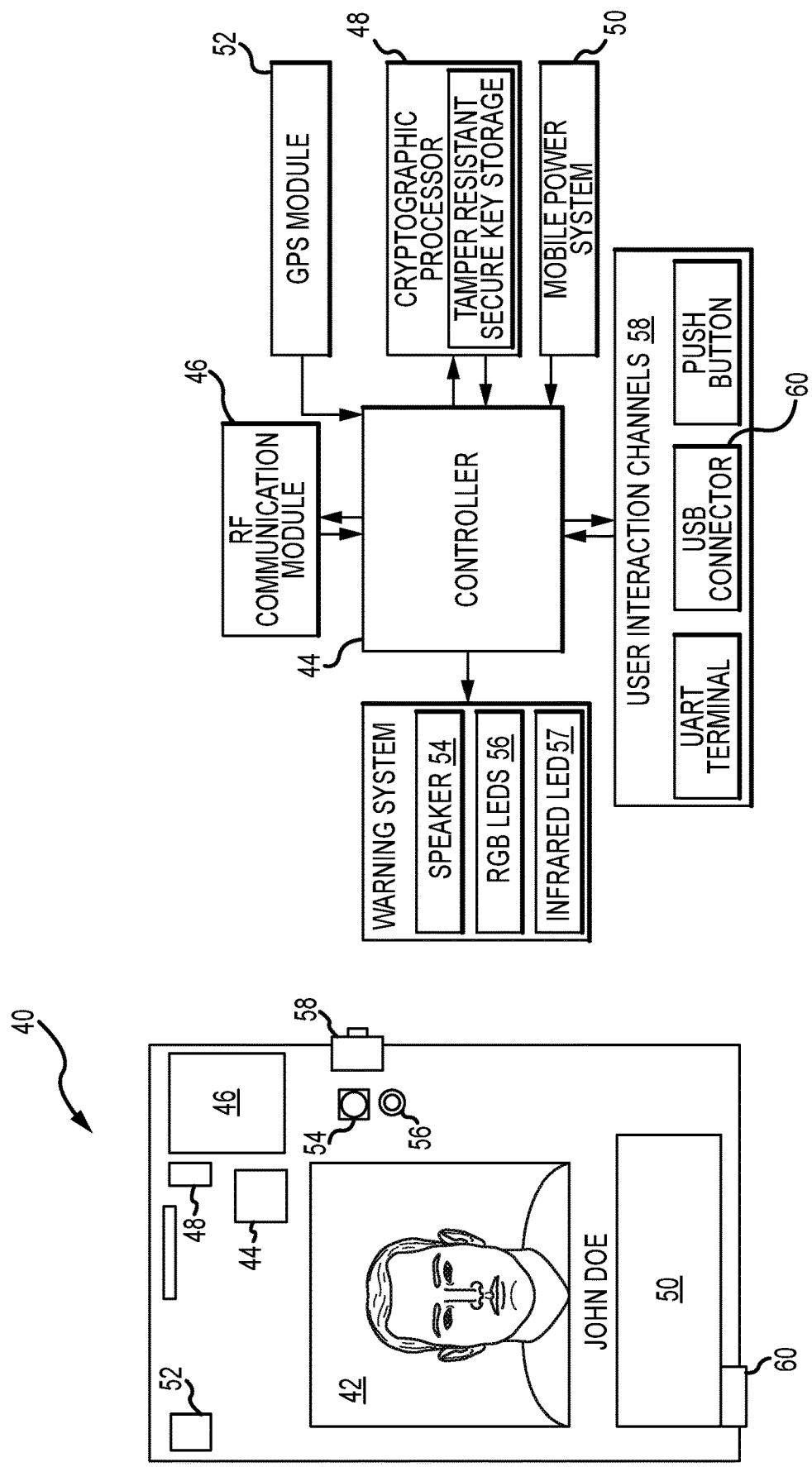
FIGS. 2a and 2b are a badge embodiment of an authentication device and a block diagram of that authentication device.

Referring now to FIGS. 2a and 2b, an embodiment of an authentication device 40 in the form of a badge worn by an individual person includes a picture 42 of the person, a controller 44 such as a microcontroller or microprocessor paired with peripheral memory storage, a bi-directional communication device 46 such as a Bluetooth Low Energy (BLE) RF module or an Infrared module, a cryptographic processor 48 (if cryptography is not integrated into the controller for communication device), a mobile power supply 50 such as a battery, a position receiver 52 such as a GPS module, computer vision (visible and LIDAR) module with a version of a SLAM (Simultaneous Location and Mapping) algorithm, triangulation module or a receiver configured to receive a location signal from a fixed beacon, a warning system such as an audio speaker 54, color LEDs 56 or infrared LEDs 57, and user interaction channels 58 such as a push button, UART terminal or USB connector 60 to facilitate debugging, updating, configuring, or charging. An additional biometric sensor may be included to provide biometric authentication such as a fingerprint, voice-verification, or facial map scan.

In an embodiment, a badge system was created using a set of integrated circuits, a wireless module, multiple LEDs, a small speaker, a pushbutton, a battery, a UART connection, and a USB charging port. The hardware selected for this embodiment was done so with ultra-low power consumption, cryptographic capabilities to support $1^{st}$ level encryption (both known=ledge and identity based), and small form factor goals in mind.

In this embodiment, an integrated circuit (IC), the PIC24FJ128GB was selected as the main controller due to its cryptographic capabilities, true random number generator, communication channels (inter-chip and other), and low-power sleep modes.

To assist in greater variety of cryptographic capability, namely the ability to challenge, respond, and verify identity-based cryptography, the Atmel ATECC508A was chosen as an additional cryptographic processing IC. The ATECC508A also provided a tamper-resistant key storage capability that would be beneficial to protect permission secret information in the case that a badge was lost.

For a wireless communication module, the Texas Instruments CC2650 Bluetooth Low-Energy (BLE) IC was selected. The CC2650 also doubled as the location awareness module by noting location beacons from fixed peers, the beacons' corresponding signal strength at receipt, and the signal strength broadcast field noting the broadcasting power. Using this information, the CC2650 calculated relative proximity to multiple fixed location beacons, and thus determined its absolute location with accuracy sufficient to determine room placement in a facility tested with this particular embodiment.

The Microchip PIC24FJ128GB facilitated all management of the other ICs on the badge, passed messages between the CC2650 and ATECC508A, controlled and stored permission seeds for knowledge based authentication, store session secrets for $2^{nd}$ level encryption authentication, controlled LEDs and a speaker for the warning system, and provided a UART interface so that a user or administrator can update badge configurations and permissions. The ATECC508 was primarily used for cryptographic processing that required identity based signatures and verification.

In this embodiment, the communication protocol between badges was selected to be Bluetooth Low Energy (BLE) because of is its ability to communicate with another BLE device without having to establish a connection. This connection-less property is called a "beacon" and can be encrypted before the BLE protocol level by the badges' ATECC508A. This "beacon" can be used to periodically broadcast a badge ID and the badge's membership in the mesh network.

The power system on the badge embodiment comprised of a small lithium battery, a low dropout regulator "LDO" to provide a constant power connection suitable to the chosen ICs, and a USB plug for charging. The badges user-interaction system was a combination of the UART connection to provide an interface for an administrator to connect to the badge using a computer, a push button for silencing alarms and instigating color challenges, and a set of LEDs to provide visual responses to human users and flash for alarming. There was also an infrared LED included in this embodiment for the possibility of having an infrared response for a central authority to test badges and monitor responses over an infrared-capable camera system.

For identity-based challenges, this embodiment used Elliptic Curve Digital Signal Algorithm "ECDSA" signatures verified by the ATECC508A and for knowledge based challenges the PIC24FJ128GB signed SHA-256 HMAC signatures. The $2^{nd}$ level cryptography in this particular embodiment used signatures that were significantly shorter, but still reliable from a security perspective since $2^{nd}$ level signatures were broadcasted very frequently. Future embodiments will likely require a quantum-computing-resilient cryptographic signature algorithm (e.g., Multivariate or Lattice-based). There may be other cases where less knowledge is required to be disclosed and less common cryptographic algorithms are used to respond to challenges. Zero-knowledge proofs or ring signatures may be used to prove location permission without anything else. The only requirement of the response is a proof that proves an adequate permission.

It is important to note that all $2^{nd}$ level messages are cryptographically signed to prove knowledge. The signatures discussed also inherently prove message integrity but data confidentiality is not required, except when passing the network membership identifier. There are numerous ways to do this with this particular embodiment taking the result of the challenge input at a stage and saving it off such that only parties with the initial network permission identifier can use it to calculate the network membership identifier. It may be useful in other cases to use a key exchange algorithm and symmetric encryption (e.g., AES, Twofish, etc.). This would also provide the ability to send other confidential messages to the mesh. This particular embodiment has an AES cryptographic engine on the PIC24FJ IC, which would be a low-power solution to achieve these results.

Position receiver 52 (if included) provides location awareness for individual peers. In some cases, the authentication system would not even need to authenticate peer-to-peer to gain security over tradition systems. The authentication devices could still authenticate peer-to-door or peer-to-centralized system and gain benefit from their location awareness. The range of the authentication devices built with the illustrated hardware architecture below has a significant range advantage over the most common badging systems use for authentication, RFID. Location awareness in the system can add multiple layers of security. This ability makes it possible to have hierarchical or compartmentalized permissions for different levels of security that are a function of location. The devices participating in the system can take location into account in deciding if a peer should be challenged or what secret knowledge to challenge them for. A peer's identity may be authorized by a device for a given location. If the peer changes location, the peer's permissions may change and the peer may lose authentication. This also adds a layer of information that can be beneficial to keep track of, for example, when logging who was accessing what resource at what time and location.

Figure 3:
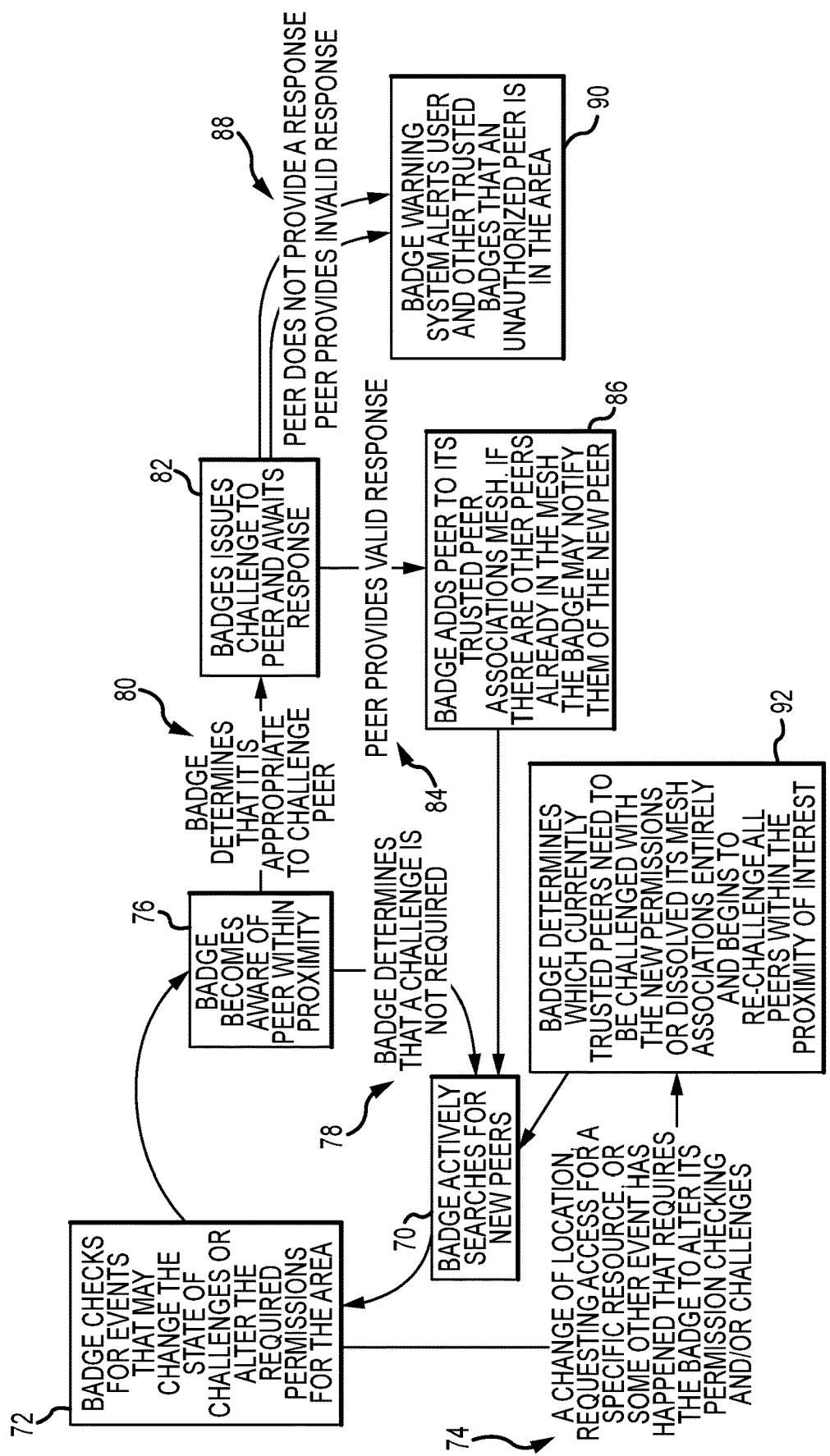
FIG. 3 is an embodiment of a flow diagram for self-organizing mobile peers/authentication devices to form a peer-to-peer mesh network.

Referring now to FIG. 3, each badge actively searches for new peers (step 70) such as by listening for a beacon or using computer vision to identify peers and checks for events that may change the state of challenges or alter the required permissions (step 72) such as a change of location, request for access to a specific resource or some other event 74. When a badge becomes aware of a peer within proximity (step 76), the badge determines either that a challenge is not required 78 or that a challenge is appropriate 80. If no challenge is required, the badge continues to search (or listen) for new peers within proximity to the badge (step 70).

If a challenge is appropriate, the badge issues a cryptographic challenge to the peer and awaits a response (82). If the peer provides a valid cryptographic response (step 84), the badge adds the peer to its mesh network as a trusted member peer and either the challenger or the new peer notifies the network of the new peer (step 86). If the peer either does not provide a valid cryptographic response or simply does not respond 88, the badge warning system alerts either the badge holder, other trusted member peer badges, the challenged badge, a central authority or a combination thereof (step 90). For example, the challenged badge may emit a sound or start blinking to notify the badge holder and other nearby peers that the badge holder is not authorized to be with the other trusted peers. Alternately, a warning signal may be sent to the central authority that an unpermitted badge holder has been identified. Changes of location, requests for access to a specific resource or some other event 74 may require that currently trusted member peers needed to be re-authenticated with new permissions or the mesh network dissolved entirely and rebuilt (step 92).

Each badge repeats this process to form and manage the mesh network as it adds or subtracts trusted peer members, moves in location, grows or shrinks in size, merges with other trusted networks or splits. The distributed nature of the mesh network makes it very difficult for a peer to avoid detection, either a legitimate peer who is simply in the wrong place or trying to access an unpermitted resource or an illegitimate peer who successfully evaded the fixed entry point security measures. If these unauthenticated peers cross paths with any other peer (within their proximity), they will be challenged and detected.

Figure 4A:
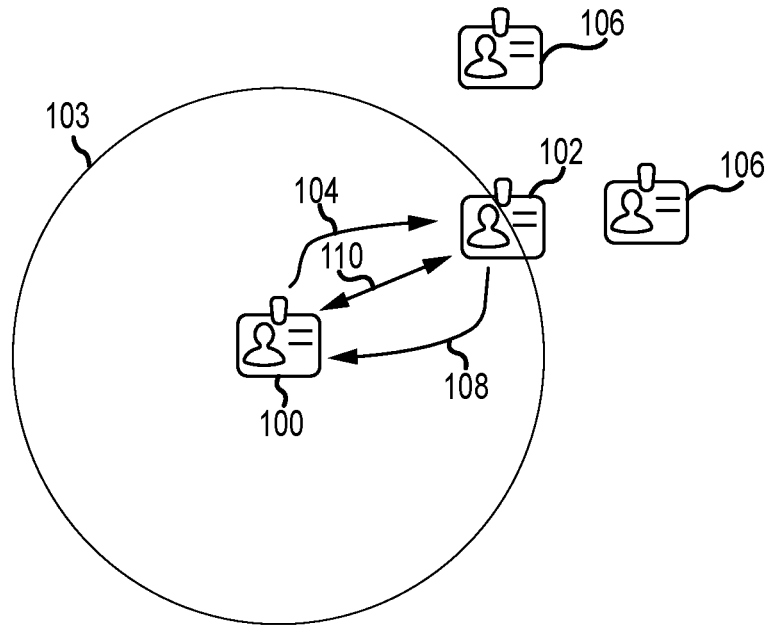
FIGS. 4a through 4e illustrate different aspects of the formation and management of the peer-to-peer mesh network.
Figure 4B:
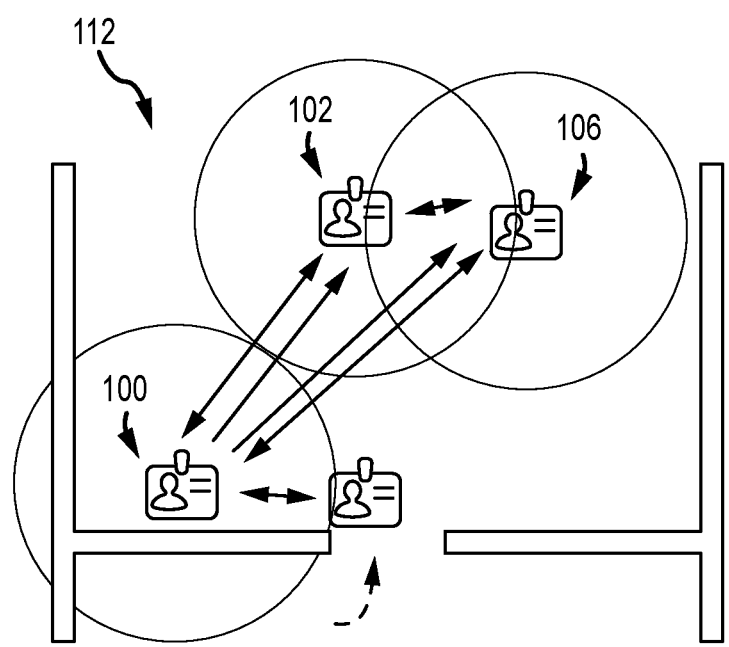

Referring now to FIGS. 4a through 4e, a number of different steps are shown in the formation and management of a mesh network. As shown in FIG. 4a, when a badge 100 becomes aware of a peer badge 102 within its proximity 103 and determines that the peer badge 102 requires authentication, badge 100 issues a cryptographic challenge 104 to the peer. Badge 100 does challenge other badges 106 outside its proximity. Peer badge 102 answers with a cryptographic response 108 that can be validated for permission to connect in a trusted relationship as a member peer. This forms a bi-directional trusted communication channel 110 that allows for subsequent communication without re-authentication. Such communication may be signed with a trusted secret determined and shared by the mesh network 112, which is far less complex than a full authentication. As shown in FIG. 4b, another peer badge 106 has been successfully authenticated by a trusted member peer and added to the mesh network 112. The addition of peer badge 106 to the mesh network is broadcast to all member peers to extend the trusted communication channel and avoid unnecessary challenges of member peers.

Figure 4C:
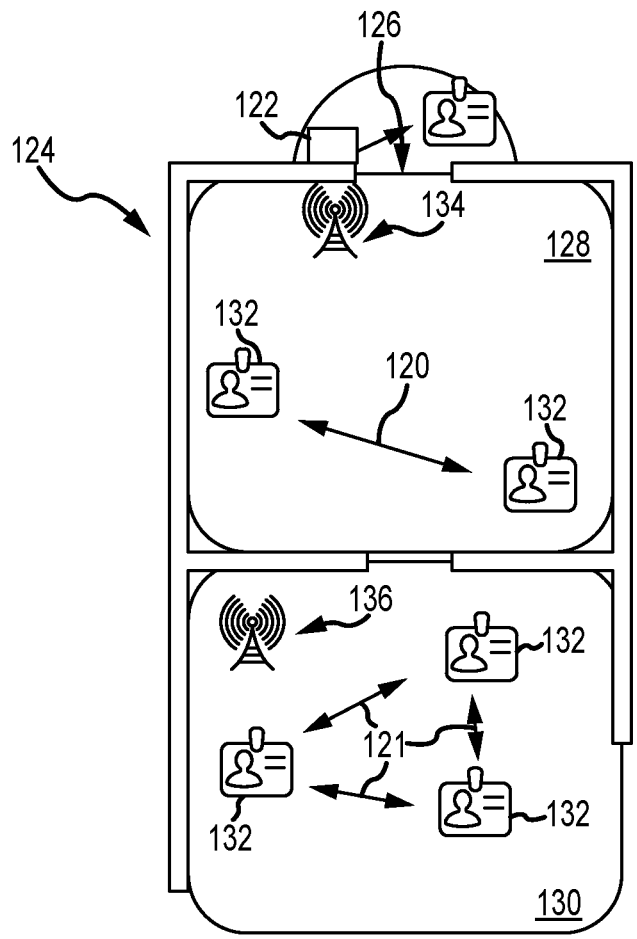

As shown in FIG. 4c, mesh networks 120 and 121 are used in cooperation with a fixed point of entry authentication system 122 to provide more robust security for a building 124 having a point of entry 126 and multiple rooms 128 and 130. The fixed point of entry authentication system 122 authenticates the badges 132 as they pass through point of entry 126. System 122 provides each badge with the appropriate permissions for the badge holder to join the mesh network, which may be a function of location. These permissions may, for example, change daily. If a badge holder passes through the point of entry without being authenticated using a social engineering technique, that badge holder will not receive the requisite permissions for joining the mesh network(s). In this example, fixed beacons 134 and 136 broadcast location information for rooms 128 and 130, respectively. Badges 132 in the respective rooms form mesh networks 120 and 121. Certain badges 132 may have permissions for both of the rooms, only one room or neither room or may have permission to be in both rooms but only to use specified resources in one of the rooms. The cryptographic challenges and cryptographic responses issued by the badges are a function of location as are the permissions. Location awareness provides for much greater flexibility to form and manage the mesh networks.

Figure 4D:
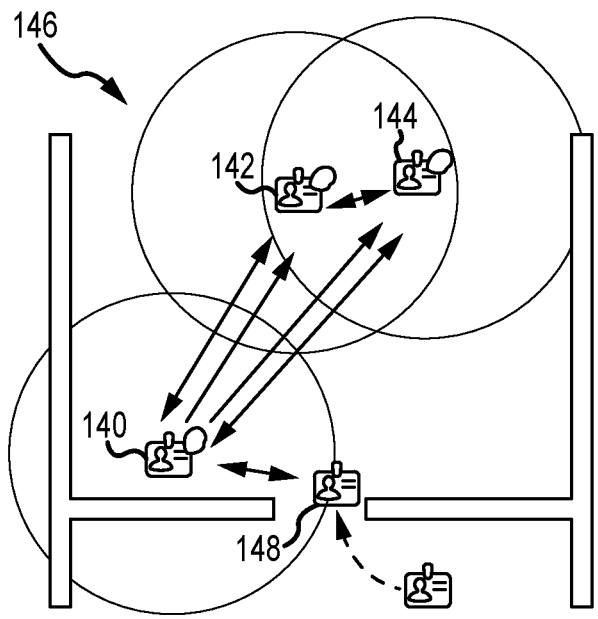

In addition to authenticating properly permissioned badges and facilitating efficient communication among trusted member peers, an important function of the mesh network is to identify improperly permissioned or dummy badges and issue a warning signal that the challenged peer lacks the proper permission. As shown in FIG. 4d, badges 140, 142 and 144 form a mesh network 146. Badge 140 issues a cryptographic challenge to a badge 148 within its proximity, which either fails to respond or provides an invalid cryptographic response. In this example, badge 140 activates its warning system to blink an LED and beacons the warning signal to the other trusted member peers who activate their LEDs to tell all the trusted badge holder that the new arrival is not authenticated and does not have the permissions to be present. In an alternate embodiment, badge 140 may send the warning signal to the new badge 148 to activate its warning system to tell the badge holder he or she is not permissioned and needs to leave. This approach handles badge holders with legitimate badges who either intentionally or unintentionally are in the wrong place or trying to use an unpermissioned resource.

Figure 4E:
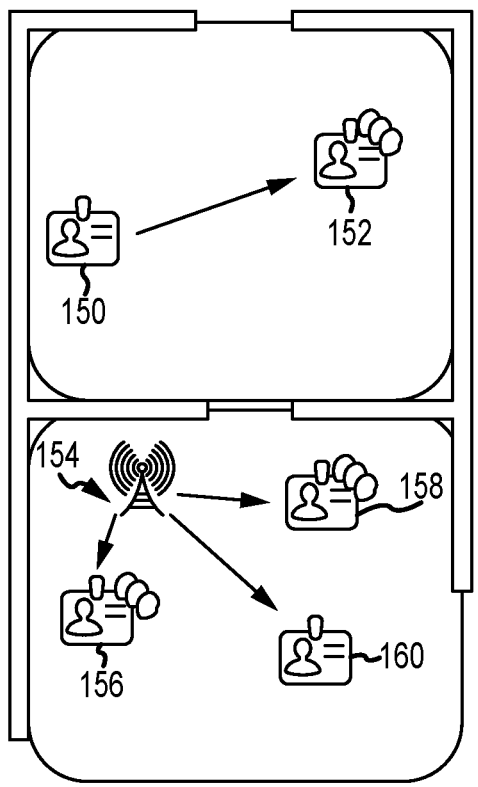

Another threat is a badge holder who has a dummy badge, one that does not send out a beacon and does not respond to challenges. If the legitimate badges rely on the beacon to detect the presence and proximity of another badge, these dummy badges may be invisible to the trusted network. This problem can be addressed by sending out a global cryptographic challenge to all peers configured to generate a human perceptible response (audio, visual) by each badge. If a badge fails to generate a response, the challenger or mesh network knows that either the badge is malfunctioning or is a dummy. As shown in FIG. 4e, in one embodiment a badge 150 issues a "color challenge" in the form of a cryptographic challenge that specifies a sequence or pattern of flashing colors to another badge 152. If badge 152 has the correct permissions, it decodes the cryptographic challenge and activates its warning system to generate the specified color pattern thereby generating a human-verifiable response. In another embodiment, a central authority 154 generates a global cryptographic challenge that is broadcast to all members of the trusted mesh. In this example, badges 156 and 158 generate the specified color pattern while badge 160 does not. Alternately, the badges could issue a specified infrared pattern to conceal the test and the detection of any unpermissioned badge holders.

Figure 5:
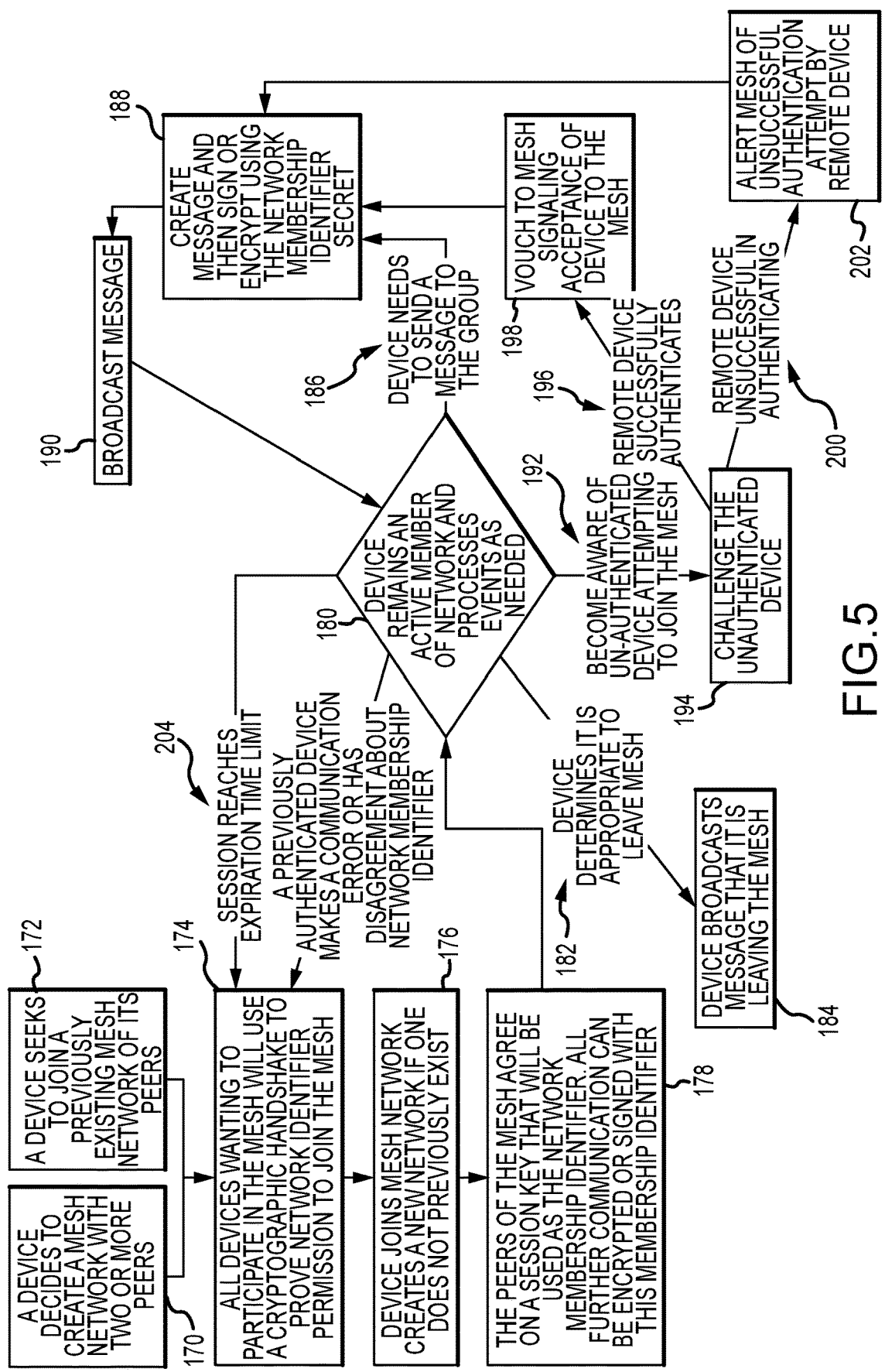
FIG. 5 is a flow diagram of an embodiment using two-level encryption (permission & membership) for persistent cryptographic sessions to form and manage the peer-to-peer mesh network.

Referring now to FIG. 5, in an embodiment the mesh network implements a method for persistent cryptographic sessions that remain open to facilitate secure and efficient communication among trusted member peers and authentication of new peers proximate the mesh network. Generally speaking a $1^{st}$ level of authentication verifies whether a participant has the proper permissions to joint a mesh network, which can be done with either identity or knowledge. Post-authentication all communication including proving that a participant is part of the mesh network uses a $2^{nd}$ level of authentication that verifies knowledge that was generated by and shared among authenticated network members. For example, the $1^{st}$ level uses a network permission identifier (identity or knowledge) to sign the cryptographic response to a cryptographic challenge. A central authority may provide this knowledge or "secret". The $2^{nd}$ level uses a network member identifier, typically knowledge generated and shared by the network, to sign the cryptographic response. The $2^{nd}$ level authentication is typically far less complex (e.g. shorter code lengths or less computations) than the $1^{st}$ level encryption allowing for the use of less power, computation time, and network traffic congestion.

In an embodiment, an authentication device either decides to create a mesh network with two more peers (step 170) or seeks to join an existing mesh network of its peers (step 172). All devices wanting to participate in the mesh or proximate the mesh will use a cryptographic "handshake" to prove permission to join the mesh (step 174). This "handshake" typically involves one authentication device issuing a cryptographic challenge to another authentication device in proximity (e.g., a certain distance) and that device returning a cryptographic response signed with a network permission identifier ($1^{st}$ level identity or knowledge). Individual cryptographic challenges will be sent to any unauthenticated device (one not already in the mesh) to identify and form trusted member peers or the presence of any unpermissioned authentication devices.

The challenged authentication device either joins the existing mesh network or creates a new mesh network with the challenging device (step 176). The trusted member peers of the mesh network agree on a session key ($2^{nd}$ level knowledge) (step 178). All further communication to broadcast membership of a new peer, to re-authenticate based on events, to share information in the network etc. can be signed with this session key (network membership identifier).

Each authentication device remains an active member peer of the mesh network and processes events and communications (step 180). If an authentication device determines it is appropriate to leave the mesh network (step 182), the device broadcasts a message that it is leaving the mesh network (step 184). If an authentication device needs to send a message to the network (step 186), the device creates a message, signs it with the session key (step 188) and broadcasts the signed message (step 190).

When an authentication device becomes aware of an un-authenticated device in proximity (step 192), the authentication device issues a cryptographic challenge (step 194). If the remote device successfully authenticates by sending a properly signed cryptographic response (signed with the network permission identifier) (step 196), the challenging device authenticates and the device is accepted as a trusted member peer (step 198) and a message signed with the network membership identifier indicating acceptance as a trusted member peer (step 188) is created and broadcast (step 190) to the network. If the remote device is unsuccessful in authorizing (step 200), the challenging device alerts mesh of unsuccessful authentication attempt (step 202), a signed message is created (step 188) and broadcast to the network (step 190). If a session expires or a previously authenticated makes a communication error or has a disagreement about the session key (step 204), either that authentication device or all devices return to step 174.

Figure 6A:
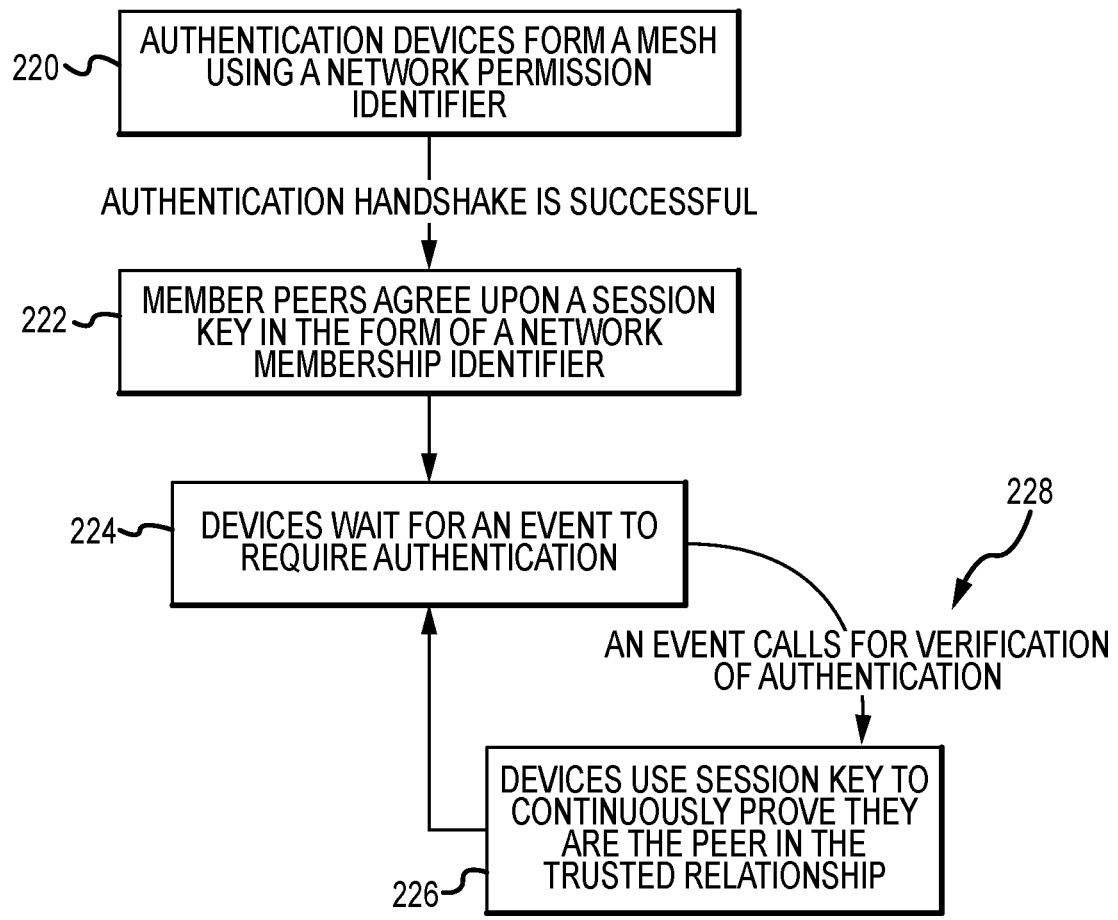
FIG. 6a is a flow diagram of an embodiment in which event-based membership encryption is used for all post-authentication communication and 6b is an embodiment of a peer with a badge that authenticates against an authentication device integrated with or attached to a laptop computer.
Figure 6B:
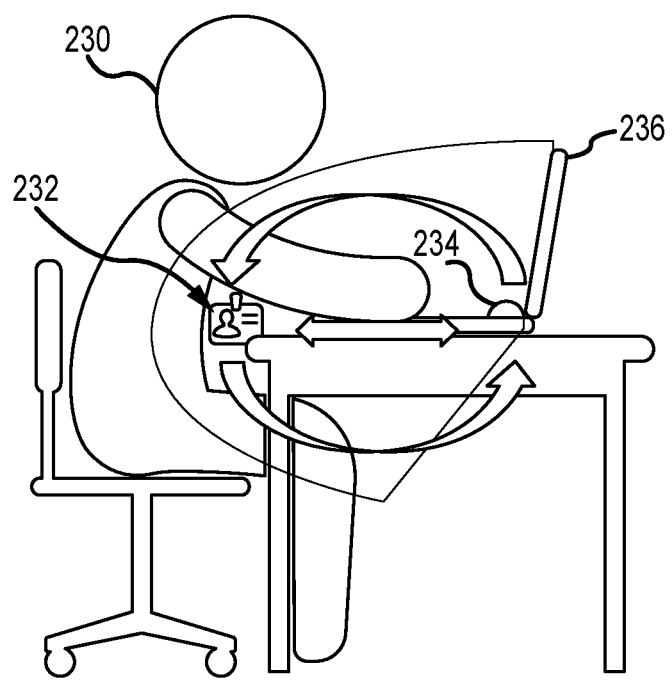

Referring now to FIGS. 6a and 6b, in certain applications once a mesh network is formed it is desirable to provide seamless authentication between trusted member peers based on the occurrence of a specified event as an additional degree of security. For example, two trusted member peers are interacting in some way that includes specified events for which an additional degree of security is desired to ensure that these two specific member peers are engaged in that activity. Or a single member peer is engaged in some activity that generates certain events that require re-authentication of the member peer to the network. For efficiency, this re-authentication is preferably executed using the session key rather than the full authentication performed to join the network.

As shown in FIG. 6a, two or more mobile peers and possibly one or more fixed peers form a mesh network using a network permission identifier (knowledge or identity) to sign the cryptographic responses (step 220). The trusted member peers agree upon a session key e.g. a network membership identifier to secure all post-authentication communication among trusted member peers (step 222). The authentication devices wait for the occurrence of an event that requires re-authentication (step 224). The authentication device generates and broadcasts a message signed with the session key to either a specific authentication device or the network as whole demonstrating that the authentication device is the peer associated with the event (step 226). The "event" may either trigger an authentication device to generate a cryptographic challenge or may directly trigger an authentication device to issue a signed cryptographic response. Either the specific authentication device (challenger) or the network as a whole verifies the signed message (step 228) thereby allowing the activity to continue.

The system is configured to authenticate based on specified peer or resource events in addition to proximity of one participant to another. Such events might include expiration of timers, random requests, high priority actions like unlocking a sensitive file, or on interaction with other computing devices. As shown in FIG. 6b, a peer 230 with a badge 232 may authenticate against an authentication device 234 integrated with or attached to a laptop computer 236, which is also a trusted member peer, upon log in, opening certain programs or files, every N key strokes, etc. The proximity capability of the authentication devices allows the laptop to determine if the peer is still within a few feet of the keyboard on each authentication. Event-based authentication can be configured to run autonomously and authenticate seamlessly and with little or no user interaction if necessary.

As shown in FIG. 7, a plurality of mobile drones 300 (e.g., air, land, sea, space) can autonomously form and manage a mobile peer-to-peer mesh network 302 in which the authentication devices 304 are either integrated with or attached to each drone. The network may receive some information such as permissions or location information from external sources or a central authority but form and manage the mesh network autonomously, enforcing authentication and denial of peers. Such a network or "swarm" of drones can be far more effective than a single drone. However, to enable operation of the "swarm" the network must ensure security (all proximate drones are supposed to be part of the swarm) and efficient communication among trusted member peers.

As shown in FIGS. 8a and 8b, an authentication device 400 may be configured to provide authentication, security and a firewall between an Internet of Things (IoT) device 402 and an external network 404 including one or more external devices. In the case of a peer-to-peer network, external network 404 represents both the network of secure member peers and other non-authenticated peers and the IoT device 402 is a particular peer either in the network or seeking to join the network. More generally, IoT devices can range from simple microcontrollers to advanced microprocessors running small computing systems created to do specific jobs like CCTV cameras, printers, smart thermostats, etc. Authentication device 400 provides a low-power add-on solution that allows the IoT device to securely join a network or interact with individual components of the external network. The device may include its own power supply (e.g., a battery) and a bi-direction communication device or may utilize the IoT device for power and communications.

The configuration and method for network level encryption handled by the IoT device can be described as follows: the communication interface must route all network traffic through a secure compute sector (PIC24FJ in the specific embodiment) that can filter, sign, encrypt/decrypt, or verify the traffic before the device can provide further processing. All information entering the device from external source must be checked for rules that can be configured to make sure that none of the traffic is harmful or is not authenticated. All traffic leaving the device can be checked to make sure that it is encrypted if needed and nothing sensitive can be let out from the secure compute section to the communication interface if it is vulnerable to eavesdropping. This sort of architecture can provide a device-based gateway or firewall that can still run efficiently with very little power usage or availability of service. The gateway can provide an interactive interface for remote administration if needed.

As shown in FIG. 8a, in one embodiment authentication device 400 is placed between IoT device 402 and external network 404 so that all incoming and outgoing communications are routed through authentication device 400. The position of the authentication device between the IoT device and the external network defines a "gateway" to all incoming and outgoing traffic through the authentication device.

As shown in FIG. 8b, in one embodiment authentication device 400 is attached to IoT device 402. The IoT device 402 is configured to include a gateway 406 to route all incoming and outgoing communications through authentication device 400. The authentication device can also encrypt and decrypt these communications providing an encrypted tunnel between the IoT device and the external device(s).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An authentication system for two or more mobile peers, comprising:
   a plurality of authentication devices each paired with one of said two or more mobile peers, each said authentication device including a controller and a bi-directional communication device configured to issue a cryptographic challenge to other authentication devices in proximity to said issuing authentication device and to authenticate itself via a cryptographic response to other authentication devices posing a cryptographic challenge, each said authentication device configured upon successful authentication to join the peer to a self-organizing mobile peer-to-peer mesh network, said mesh network configured to verify permissions of its member peers to be in a location proximate to the other member peers, each said authentication device configured upon unsuccessful authentication to generate a warning signal that the challenged peer lacks proper permission.

2. The authentication system of claim 1, comprising a plurality of authentication devices for each of three or more mobile peers.

3. The authentication system of claim 1, wherein the two or more mobile peers are selected from humans, mobile machines or a combination thereof.

4. The authentication system of claim 1, wherein each said authentication device includes a positioning receiver configured to determine a location of said authentication device and said peer, wherein each said peer's permissions are a function of location and wherein the cryptographic challenge and cryptographic response are a function of location.

5. The authentication system of claim 4, wherein said position receiver comprises one of a beacon receiver configured to receive a location signal from a fixed beacon, a GPS receiver, a receiver configured to receive and process multiple triangulation signals or a computer vision system configured to process imagery proximate the peer to determine the location of the authentication device and peer.

6. The authentication system of claim 1, wherein pre-authentication the authentication device is configured to sign the cryptographic response with a network permission identifier that defines the peer's permission to join the mesh network, wherein post-authentication the authentication device of each said member peer is configured to sign the cryptographic response with a network membership identifier that demonstrates membership in the mesh network.

7. The authentication system of claim 6, wherein the authentication device is configured to sign the cryptographic response with the network permission identifier that provides either a permissioned identity of the peer or permissioned knowledge provided by a central authority to join the mesh network, wherein the self-organizing mobile peer-to-peer mesh network is configured to determine and share membership knowledge in the network membership identifier with the peer upon joining the mesh network to demonstrate membership.

8. The authentication system of claim 7, wherein if the network permission identifier provides permissioned knowledge, the mesh network is configured to share the network membership identifier in which a length of the network permission identifier is at least three times as long as a length of the network membership identifier, wherein if the network permission identifier provides permissioned identity, the mesh network is configured to share the network membership identifier in which a number of computing cycles for computing the network permission identifier is at least one hundred times that for the network membership identifier.

9. The authentication system of claim 6, wherein post-authentication to join the mesh network, the member peers' authentication devices are configured to issue additional cryptographic responses signed with the network membership identifier to re-authenticate a member peer based on the occurrence of a defined event.

10. The authentication system of claim 9, wherein the defined event is an action taken by one of the two member peers issuing the cryptographic challenge or cryptographic response.

11. The authentication system of claim 10, wherein one said mobile peer is a human with a badge including the authentication device, further comprising a fixed peer that is a computer with one said authentication device, wherein upon defined events for actions taken by the human in use of the computer, the computer's authentication device issues the cryptographic challenge to the human's authentication device to ensure that the permissioned human is the one currently using the computer.

12. The authentication system of claim 1, wherein each said authentication device includes a warning system configured to generate a response to the issuance of the warning signal.

13. The authentication system of claim 1, further comprising a central authority configured to issue a global cryptographic challenge to all peers proximate the mesh network, all said authenticated peers in the mesh network configured to generate a positive response, any said unauthenticated peers either failing to respond or generating a negative response.

14. The authentication system of claim 13, wherein each said authentication device includes a warning system configured to generate a colored visual response to the issuance of the warning signal and configured to generate a particular colored visual pattern as the positive response to the global cryptographic challenge.

15. The authentication system of claim 1, further comprising a central authority configured to verify peer and authentication device permissions at a fixed point of entry and to issue permissions to the peers to join the mesh network.

16. The authentication system of claim 1, wherein the paired peers and authentication devices operate autonomously to form and manage the mesh network.

17. The authentication system of claim 16, wherein said peers and their authentication devices are configured to only issue cryptographic challenges to join the mesh network to unauthenticated peers.

18. The authentication system of claim 1, wherein each said authentication device includes a beacon configured to periodically broadcast a device identifier and an network membership identifier indicating whether the peer has been authenticated as a member peer of the mesh network.

19. An authentication system for a plurality of peers, comprising:
a plurality of authentication devices each paired with one of three or more peers of which at least two are mobile peers, each said authentication device including a controller, a positioning receiver to determine location and a bi-directional communication device including a beacon configured to periodically broadcast a device identifier and a network membership identifier, said authentication device configured to issue a cryptographic challenge to unauthenticated peers in proximity to the issuing authentication device as a function of location and to authenticate itself via a cryptographic response signed with a network permission identifier to peers posing a cryptographic challenge, each said authentication device configured upon successful authentication to join the peer to a mobile peer-to-peer mesh network, said mesh network configured to verify and share permissions of its member peers with the network membership identifier to be in a location proximate to the member peers at a particular location, each said authentication device configured upon unsuccessful authentication to generate a warning signal that the challenged peer lacks proper permission, each said authentication device configured to sign all post-authentication cryptographic responses between a member peer and the network with the network membership identifier.

20. The authentication system of claim 19, wherein each said authentication device is configured to evaluate a peer's permissions to join a particular mesh network and to use specified resources as a function of location.

21. The authentication system of claim 19, wherein each said authentication is configured to sign the post-authentication cryptographic responses with said the network permission identifier that provides either a permissioned identity of the peer or permissioned knowledge provided by a central authority to join the mesh network, wherein the mesh network is configured to determine and share membership knowledge in the network membership identifier with the peer upon joining the mesh network to demonstrate membership.

22. An authentication system for two or more drones, comprising:
   a plurality of authentication devices each paired with one of said two or more drones, each said authentication device including a controller, and a bi-directional communication device including a beacon configured to periodically broadcast a device identifier and a network membership identifier, said authentication device configured to issue a cryptographic challenge to unauthenticated drones in proximity to the authentication device and to authenticate itself via a cryptographic response signed with an encrypted network permission identifier to drones posing a cryptographic challenge, each said authentication device configured upon successful authentication to join the drone to a mobile peer-to-peer mesh network, said mesh network configured to verify and share permissions of its member drones with the encrypted network membership identifier to be in a location proximate to the member drones, each said authentication device configured upon unsuccessful authentication to generate a warning signal that the challenged peer lacks proper permission, each said authentication device configured to sign all post-authentication cryptographic responses between a member drone and the network with the network membership identifier.

* * * * *

UNITED STATES PATENT AND TRADEMARK OFFICE
CERTIFICATE OF CORRECTION

PATENT NO. : 11,025,439 B2
APPLICATION NO. : 16/104738
DATED : June 1, 2021
INVENTOR(S) : Theodore et al.

Page 1 of 1

It is certified that error appears in the above-identified patent and that said Letters Patent is hereby corrected as shown below:

In the Specification

In Column 3, Line 3, after "other.", delete a linebreak

In Column 12, Line 13, delete "joint" and insert --join-- therefor

Signed and Sealed this
Ninth Day of November, 2021

Drew Hirshfeld
*Performing the Functions and Duties of the
Under Secretary of Commerce for Intellectual Property and
Director of the United States Patent and Trademark Office*